United States Patent [19]

Lansing

[11] Patent Number: 4,852,471
[45] Date of Patent: Aug. 1, 1989

[54] SEMIAUTOMATIC FRYING MACHINE AND AIR FILTER APPARATUS THEREFOR

[75] Inventor: James P. Lansing, St. Cloud, Minn.

[73] Assignee: JVJ Enterprises, Inc., St. Cloud, Minn.

[21] Appl. No.: 119,785

[22] Filed: Nov. 10, 1987

[51] Int. Cl.$^4$ .............................................. A47J 37/12
[52] U.S. Cl. ..................................... 99/330; 98/115.1; 99/336; 99/409; 99/411; 126/299 R; 126/388; 219/432; 219/435; 219/436; 219/441
[58] Field of Search ................. 99/327, 330, 332, 335, 99/336, 337, 463, 409, 410, 411, 414, 416, 417, 426, 431, 450, 476; 98/115.1; 126/388, 299 R, 299 D; 219/432–437, 441

[56] References Cited

U.S. PATENT DOCUMENTS

| | | |
|---|---|---|
| 1,196,169 | 8/1916 | Stillman . |
| 1,554,471 | 9/1925 | Trumble . |
| 1,649,387 | 11/1927 | Brosi . |
| 2,141,903 | 12/1938 | Brundage . |
| 2,145,049 | 1/1939 | Heuberger . |
| 2,212,905 | 8/1940 | Tota . |
| 2,222,314 | 11/1940 | Husk . |
| 2,400,180 | 5/1946 | Venable . |
| 2,562,839 | 7/1951 | Winston . |
| 2,753,436 | 7/1956 | Schwaneke . |
| 2,868,112 | 1/1959 | Bushway . |
| 2,910,223 | 10/1959 | Schlumbohm . |
| 2,918,196 | 12/1959 | Le Bron . |
| 3,165,186 | 1/1965 | Zeiter . |
| 3,191,362 | 6/1965 | Bourgeois . |
| 3,217,633 | 11/1965 | Anetsberger . |
| 3,384,067 | 5/1968 | Rawald et al. ............... 98/115.1 X |
| 3,443,633 | 5/1969 | Carnavos . |
| 3,525,299 | 8/1970 | Gouwens et al. ............. 99/403 X |
| 3,685,432 | 8/1972 | Hoeberigs . |
| 3,756,217 | 9/1973 | Field ........................... 98/115.1 X |
| 3,757,495 | 9/1973 | Sievers . |
| 3,812,370 | 5/1974 | LaViolette . |
| 3,818,820 | 6/1974 | Harris et al. . |
| 3,925,043 | 12/1975 | Matrone et al. . |
| 3,954,427 | 5/1976 | Jenn ........................... 98/115.1 X |
| 3,975,997 | 8/1976 | DiPietro . |

| | | |
|---|---|---|
| 4,244,712 | 1/1981 | Tongret . |
| 4,268,285 | 5/1981 | Mason . |

(List continued on next page.)

FOREIGN PATENT DOCUMENTS 993809 7/1986 Canada .
92075 12/1921 Switzerland .

*Primary Examiner*—Harvey O. Hornsby
*Assistant Examiner*—Stephen F. Gerrity
*Attorney, Agent, or Firm*—Fitch, Even, Tabin & Flannery

[57] ABSTRACT

Disclosed is a semiautomatic frying apparatus including a food carrying basket having a forward mounting lip and a rearward handle. The apparatus includes a basket-supporting shaft having a lip-engaging cradle for mounting the basket to the shaft. Disposed beneath the shaft, in a position to receive the basket upon rotation of the shaft, is a vessel holding heated cooking medium such as oil. A plate-like heater disposed beneath the vessel in heating contact therewith includes a bottom surface having a recess for mounting one or more temperature sensors, the recess opening into an airflow cavity. The frying apparatus is disposed within a cabinet and a fan and filter, also disposed within the cabinet, provides an air flow therethrough. A door connected by linkage to the basket-supporting shaft selectively blocks air flow through the cavity beneath the heating plate, and when opened to an unblocking position, purges heated air from the recess air, providing compensation for the temperature sensors therein. Also disclosed is an air filter consisting of a box-like container, the endwalls of which are slotted at their outer edges for flow through the container. Disclosed within the container is a central internal wall slotted at its center to allow air flow therethrough. Disposed between the central wall and either endwall is a pad of filter media. The air flow is constrained to move between the major surfaces of the filter media to prolong the residence time and improve contact between the air flow and the filter media.

5 Claims, 8 Drawing Sheets

U.S. PATENT DOCUMENTS

| | | |
|---|---|---|
| 4,358,296 | 11/1982 | Notadonato et al. . |
| 4,361,427 | 11/1982 | Barradas . |
| 4,370,155 | 1/1983 | Armbruster . |
| 4,489,647 | 12/1984 | Stamps et al. .................. 99/337 X |
| 4,505,194 | 3/1985 | Bishop et al. ...................... 99/336 |
| 4,514,197 | 4/1985 | Armbruster . |
| 4,520,717 | 6/1985 | Bohrer, Jr. et al. . |
| 4,539,898 | 9/1985 | Bishop et al. . |
| 4,541,847 | 9/1985 | Oie et al. . |
| 4,593,170 | 6/1986 | Maeda et al. .................. 99/403 X |
| 4,644,931 | 2/1987 | Veth ........................ 126/299 R X |
| 4,691,096 | 9/1987 | Knauss ........................ 219/436 X |
| 4,713,522 | 12/1987 | Kimura ........................ 219/441 X |
| 4,724,825 | 2/1988 | Fritsch et al. ................ 219/433 X |
| 4,726,288 | 2/1988 | Lansing ............................ 99/330 |

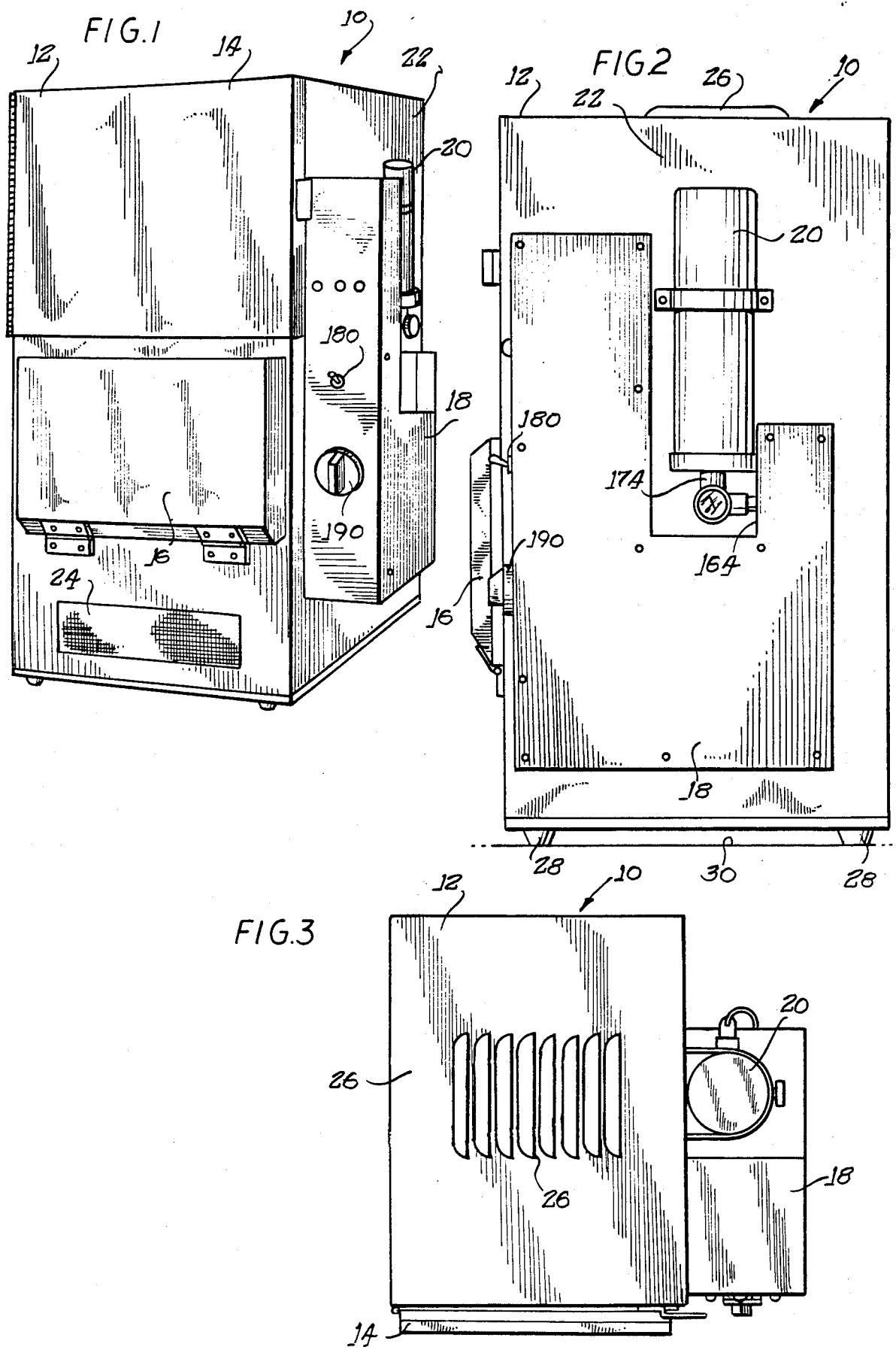

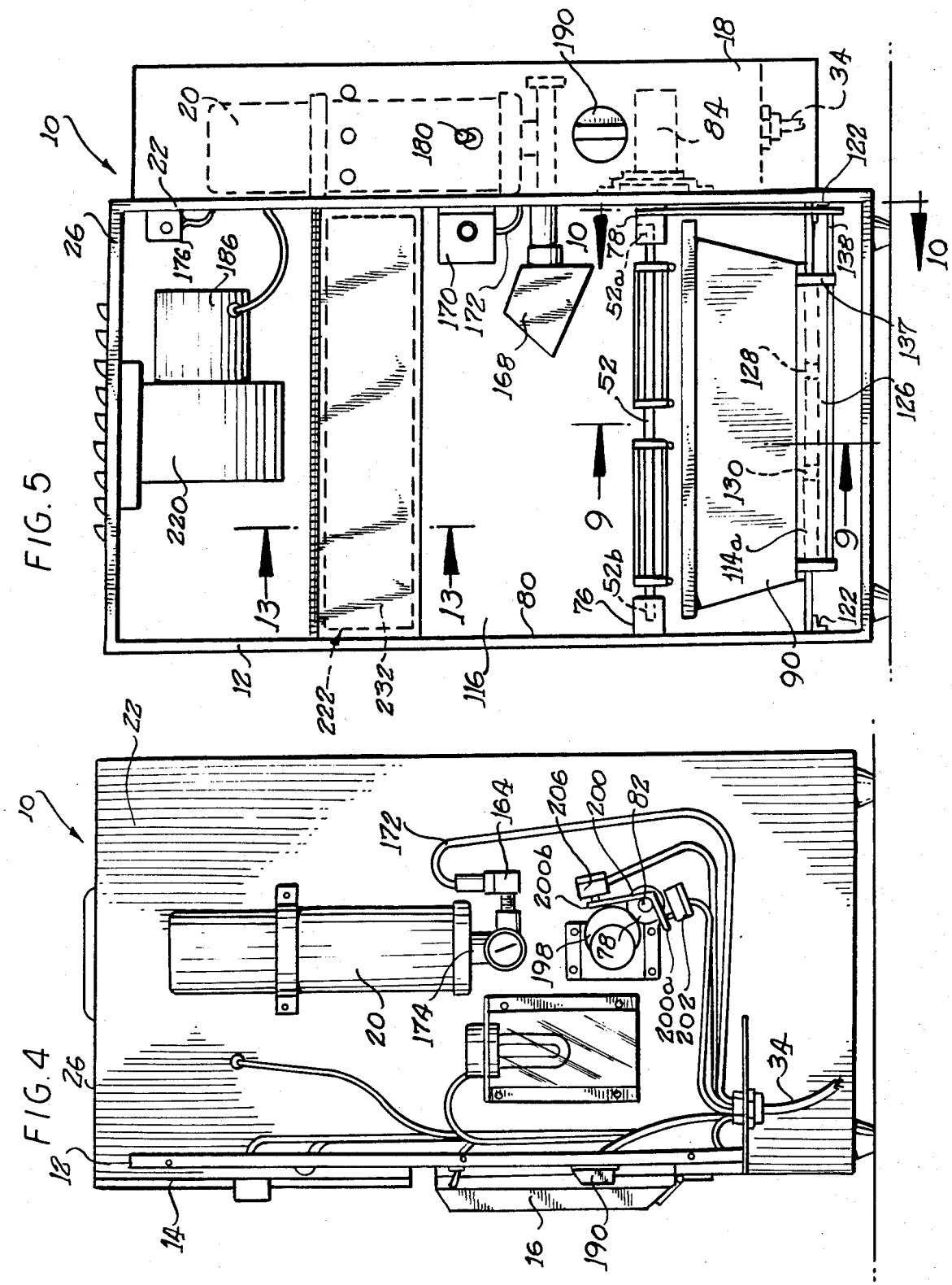

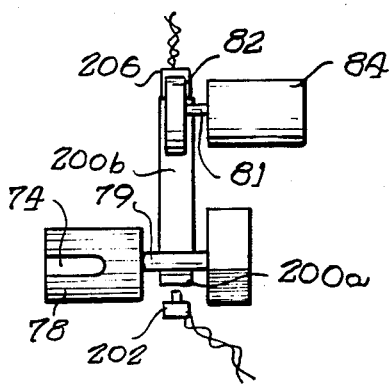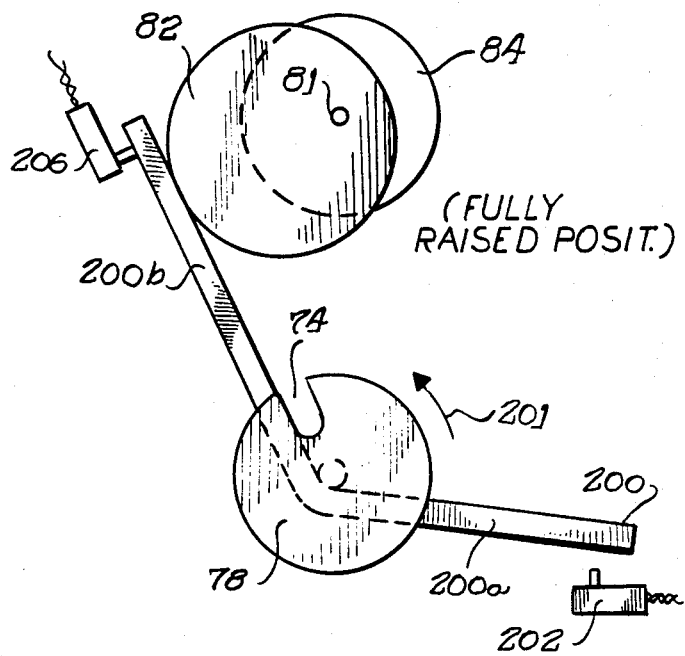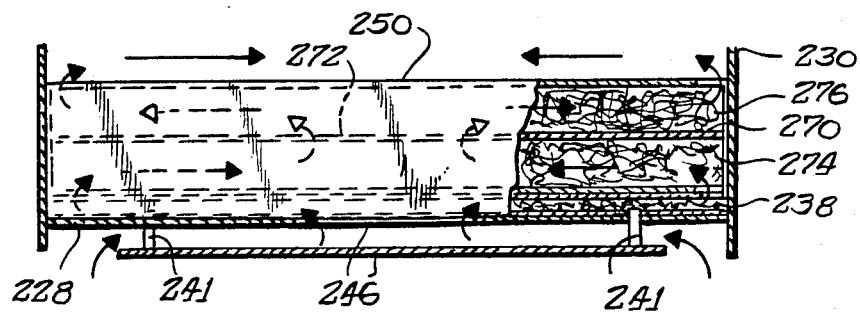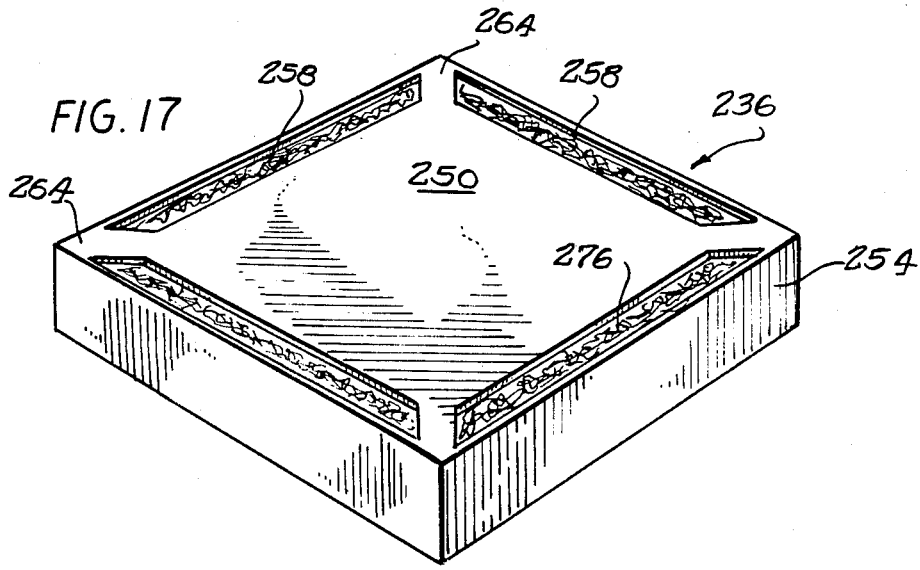

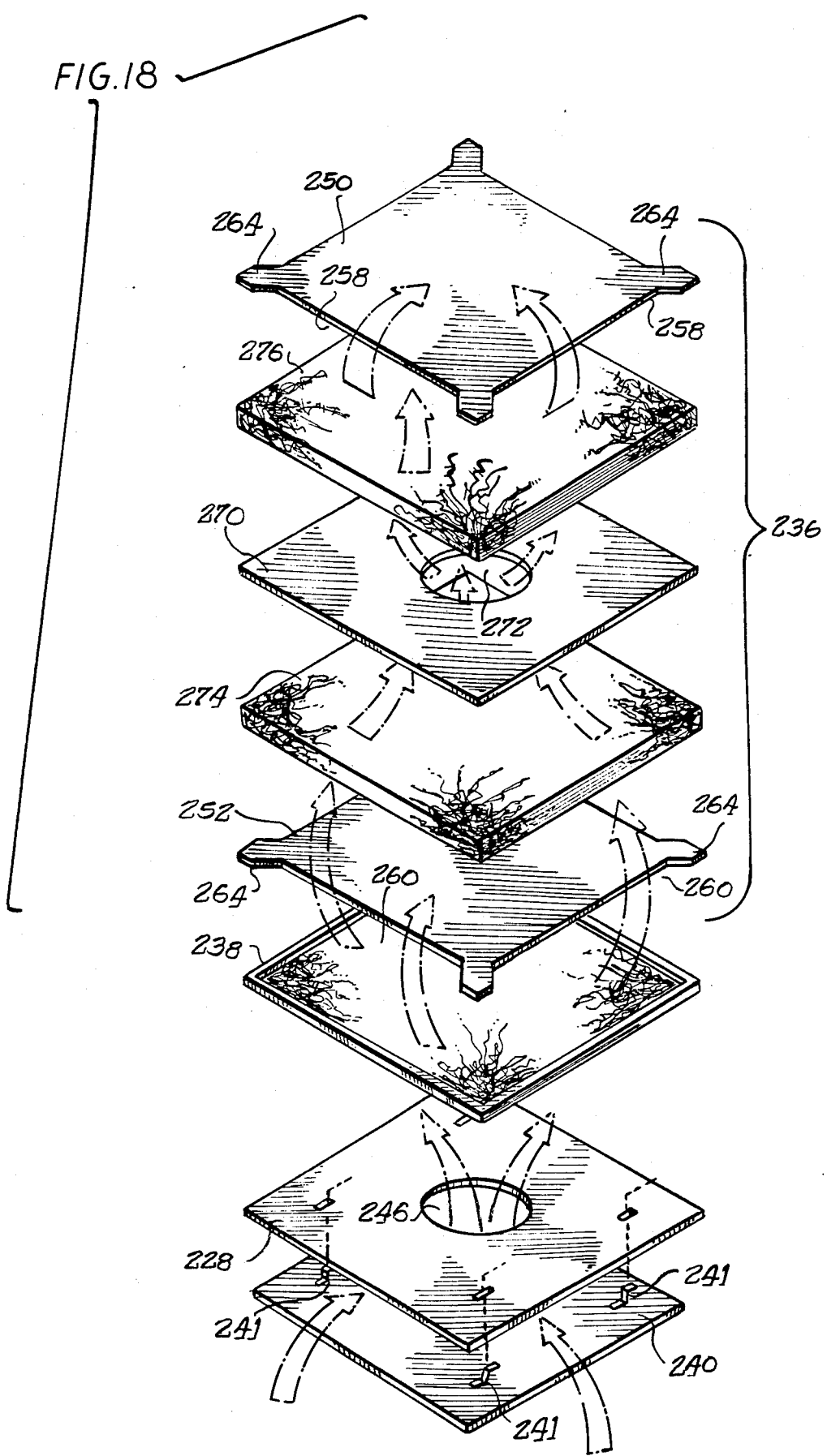

SEMIAUTOMATIC FRYING MACHINE AND AIR FILTER APPARATUS THEREFOR

BACKGROUND OF THE INVENTION

1. Field of the Invention

The present invention pertains to deep fat frying machines and in particular to such machines having semiautomatic capability for initiating and terminating a cooking cycle. The present invention also pertains to air filters for deep fat frying machines and the like.

2. Brief Description of the Prior Art

Deep-fat fried foods are enjoying increasing popularity today. Typically, large institutions, restaurants and the like maintain a vat or vessel of heated cooking oil during periods of anticipated use so that a cook need only prepare the food to be deep-fat fried, load the prepared food into an open wire basket and immerse the basket in the vat to initiate a cooking cycle. One example of a heated vat for a deep-fat food fryer is given in U.S. Pat. No. 2,212,905, which includes a system for circulating the hot fat for filtering thereof, during its use. However, the fryer, intended for use by a cook or other trained personnel, requires manual insertion and extraction of a basket to initiate and terminate a cooking cycle. Further, the fryer requires a custom installation in a kitchen, including external ventilation, and has a minimum of controls and safety-related features.

U.S. Pat. No. 2,222,314 discloses a deep-fat frying cooking machine with a mechanized apparatus for raising a food-carrying basket from a vat of heated fat when a predetermined temperature in the vat is attained, an event from which completion of the cooking cycle is inferred. Also disclosed is a time delay for delaying raising of the basket after the temperature is reached. As with the previously-mentioned frying machine, the machine of U.S. Pat. No. 2,222,314 requires a custom installation in a kitchen, and an external ventilation system. The machine has a minimum of safety-related features, and lacks a more sophisticated cooking control system needed for minimum cooking times and for a faster response of the heating system during a cooking cycle.

U.S. Pat. No. 2,753,436 discloses a tabletop deep fat fryer of the type adapted for domestic household and restaurant use, including a heat anticipator for the heat controlling element. The anticipator, consisting of a glow coil, anticipates the heat level given off by the main heating element. The arrangement maintains a substantially constant temperature for a maximum food capacity in a fat-containing well of limited size.

U.S. Pat. No. 2,868,112 provides another example of a semiautomatic deep-fat frying cooking machine having a motor-driven mechanism for raising and lowering a foraminous basket. The mechanism includes a vertically extending guide channel in which a vertically-extending wire loop rides. The loop has an upper hook portion which receives a loop formed at one end of the foraminous basket. The basket also includes horizontally-extending stub-like wire portions which slide against one side of the vat, to maintain the basket in a stable, generally horizontal position as the upper corner thereof is raised and lowered by the sliding linkage mechanism. The motor-driven mechanism contacts the bottom of the vertically-extending elongate link. As the bottom of the link is raised and lowered by the motor-driven mechanism, the upper hook-shaped end, engaged with the basket, follows. Contact between the stub-like wire ends and the vessel sidewall is objectionable, particularly over repeated use and repeated cycling of the lowering mechanism. Further, the cooking machine is designed for a customer installation in an open area, having external ventilation means.

Another arrangement for raising and lowering a basket in a deep-fat fryer using a motor-driven mechanism is disclosed in U.S. Pat. No. 3,217,633. A food-containing basket has a downwardly-extending hook-like loop at one end. The frame for hanging the basket is mounted for movement in vertical directions, and is located against one wall defining a vat of a deep-fat fryer. The basket hanger includes generally-horizontally extending rods, an upper rod for receiving the hook-like loop of the basket and a lower rod for contacting a lower portion of the basket front wall, underneath the hook-like loop. The arrangement requires a relatively large floor-mounted unit for use in an open space having external ventilation. A considerable amount of vertical room above the back of the fryer is required, particularly when the basket frame moves the basket to an elevated position. As with the mechanism of U.S. Pat. No. 2,868,112, the mechanism and food-containing basket are reciprocated in generally vertical directions. Although the basket frame of U.S. Pat. No. 3,217,633 provides a generally more stable mounting of the basket, it requires that the lower end of the frame be either immersed in the oil during cooking or suspended just above the oil, where oil and food particles which cling to the frame become hardened, presenting difficulty in cleaning.

U.S. Pat. No. 3,685,432 discloses an automatic vending machine for deep-fat fried potatoes. A relatively complicated and bulky conveyor system moves a food-containing basket along a relatively complicated path, which not only moves the basket into and out of heated oil, but also tips the basket into a dispensing chute. The conveyor is impractical for semiautomatic partially attended operation. The basket is suspended by a pair of opposed, laterally extending rod-like members. A second basket, generally triangular in lateral cross-section, is used to immerse the uncooked potatoes in a vat of cooking oil. The second basket is rotatable about an horizontal axis. An extension of the basket beyond the axis is connected to an outer periphery of a drive disk which when rotated, levers the basket about a shaft aligned the axis of rotation. It is difficult to control smaller jerking movements of the basket as it is raised and lowered by the eccentric drive disk. The basket is unconnected to the shaft, and merely bears against the shaft with a rolling motion. Since the vending machine is designed for fully unattended operation, it is essential that the frying basket remain in continuous engagement with the drive mechanism for raising and lowering the basket into the fat-containing heated oil. The cooked potatoes are discharged from the frying basket by driving the basket to approach an overturned condition, whereupon the bottom of the basket is beat with a hammer mechanism. The automatic vending machine is fully enclosed, and therefore requires a ventilation system. A filter is provided in front of a fan to remove vapors from the exhausted air.

U.S. Pat. No. 3,818,820 discloses a dispensing apparatus for french-fried potatoes. A generally ladle-shaped member has a lower cavity for receiving uncooked potatoes and for immersing the uncooked potatoes in a vat of heated oil. The handle-like portion of the ladle is trough-like in shape in cross-section, and provides a funnel to guide cooked potatoes toward a destination point. The ladle-like member has a pivotal mounting along the handle-like portion and is tipped back and forth where, in a first direction, the cavity-defining end is immersed in heated oil and, in the other direction, the cavity is discharged into the funnel-like handle, which is inclined away from the vat. The apparatus is designed for use in a fully automated machine and requires a relatively large volume surrounding the ladle-like member because of its geometric shape and movable mounting.

U.S. Pat. No. 3,975,997 discloses a deep-fat fryer which automatically raises and lowers a food-containing basket in a vat of heated oil. A mechanism for moving the basket includes a second, outer basket permanently mounted to the vat through a complex series of linkages for rocking and translating the outer basket. The mechanism includes a number of moving parts immersed in the oil and thus presenting a cleaning problem. The mechanism is relatively costly to produce.

U.S. Pat. No. 4,520,717 discloses a deep-fat food frying apparatus enclosed in a cabinet and having a heated vessel for containing the fat, above which is disposed a cylindrical paper filter with a charcoal element in the central hollow portion thereof. The filter is relatively bulky, and provides a relatively simple, short path for the air traveling therethrough, thus requiring relatively short residence time within the filter. A food-containing basket having a pair of laterally-spaced downwardly-extending handles is positioned at its rear or trailing end. The basket is inserted into the enclosed cabinet, above the cooking oil, as the downwardly-extending handles are aligned with and inserted in handle-engaging brackets mounted on a rotating drive shaft. Thus, both handles must be concurrently engaged with the drive shaft before an operator can release the basket. The mounting and demounting of the basket is somewhat awkward, given the small confined space within the cabinet.

Summary of the Invention

Accordingly, it is an object of the present invention to provide a semiautomatic frying machine which provides easy insertion and removal of a food-carrying basket and which automatically raises and lowers the basket into and out of engagement with heated cooking oil.

Another object of the present invention is to provide a semiautomatic frying machine having an electric heating element and a control system therefor, with improved compensation in the heater control, thereby providing accelerated heating of the cooking oil.

Yet another object of the present invention is to provide a semiautomatic frying machine disposed within a cabinet and having an improved filter for the air circulation therein.

Yet another object of the present invention is to provide an improved drive system for raising and lowering a food-carrying basket in a semiautomatic frying machine which allows ready disassembly and removal of the major components thereof, especially those components in contact with cooking vapors emanating from the heated oil.

These and other objects of the present invention which will become apparent from studying the following description and appended drawings are provided in a semiautomatic frying machine comprising a food-carrying basket having a forward mounting lip and a rearward handle. An elongated rotatably mounted basket-supporting shaft has lip-engaging means for selectively engaging and disengaging the basket lip as the basket is moved in generally forward and rearward directions, respectively. Rotation means rotate the shaft in opposing directions between first and second positions in response to first and second rotational control signals. Vessel means hold a liquid cooking medium, and are spaced from the shaft so that a basket having the lip thereof engaged with the lip engaging means is at least partly immersed in the liquid cooking medium when the shaft is in the first position and removed from the liquid cooking medium when the shaft is in the second position. Heating means heat the liquid cooking medium in the vessel. Control means are included for initiating an input signal, and are responsive to the input signal for initiating a sequence of first and second control signals for rotating the shaft so as to bring the basket into and out of engagement with the liquid cooking medium. Connecting means transmit the first and second control signals from the control means to the rotating means.

In other aspects of the present invention, the frying apparatus includes a cabinet having a lower portion enclosing the cooking vessel and an upper portion housing fan and filter means, the fan creating an air flow though the cabinet by drawing air through an inlet in the cabinet disposed adjacent the cooking vessel, and the filtering means of filtering air exhausted from the cabinet.

Other aspects of the present invention are provided by an air filter module comprising a filter-receiving chamber formed in the cabinet having a pair of opposed endwalls joined together by at least one intermediate sidewall, and door means providing access to the interior of the chamber from outside the cabinet for insertion of an air filter element therein.

In other aspects of the present invention, a cartridge-like air filter element is provided with spaced-apart upstream and downstream endwalls having major surfaces opposing each other and an outer portion defining at least one recess for allowing air flow therepast. Disposed between the endwalls are at least two layers of filter media, each layer having a pair of opposed major surfaces, one surface of which opposes an endwall major surface and the other surface of which opposes the other media layer. Each layer of filter media includes an inner portion and an outer portion and defines an air flow path through the layer between the inner and outer portions. The filter further includes an inner wall defining an internal aperture. The inner portions of the two media layers overlie the inner wall internal aperture and the outer portions of the media layers are located adjacent the recesses of the air filter endwalls so that the air flow passes between the recesses of the endwalls by traveling through the media layers between the inner and outer portions thereof, generally along a labyrinthian path. Preferably, the air flow passes through the media layer between an inner portion of one major surface thereof and an outer portion of the other major surface thereof.

Other objects of the present invention are provided in a frying apparatus of the above-described type wherein the heating means comprises a generally plate-like member having an upper vessel-engaging surface disposed below said shaft and an internal electrical heat source. The plate-like member preferably defines a downwardly-extending cavity at its lower end and has at least one temperature sensor for sensing the temperature of the heating means disposed adjacent the cavity. In other aspects of the present invention, a plate-like member also defines a downwardly-facing recess opening into the cavity with the temperature sensor located within the recess. Air ventilation means such as that described above creates an air flow around the vessel to withdraw cooking vapors rising therefrom and further induces air flow through the cavity and across the temperature sensor, preferably so as to provide rapid recovery of a proper cooking temperature upon an initial cooling of liquid cooking medium in the vessel when cold or lukewarm food products are inserted therein.

According to other aspects of the present invention, a door adjacent the front of the plate-like member is provided, movable between an open position which allows air flow through the cavity and across a temperature sensor and a closed portion for blocking that air flow past the temperature sensor, thereby providing temperature compensation for the heating means. In one embodiment, the door is opened when the food-carrying basket is lowered into a vessel containing a cooking medium. This introduces a cooling air flow across the temperature sensor, controlling electrical energy to the electrical heater within the plate-like member, thereby compensating for transient cooling of the liquid cooking medium upon insertion of a food product, and accelerating the initial heating of the cooking vessel during a cooking cycle.

In one preferred embodiment of the present invention, a cantilever arm is attached at one end to the basket-supporting shaft and rotates therewith as the basket is raised and lowered with respect to the cooking vessel. The cantilever arm is connected through linkage to a door hingedly connected near the bottom of the heating means. With the door open, air flow is directed across or adjacent to the temperature sensor, initiating a rapid heating of the cooking vessel at the initiation of a cooking cycle.

BRIEF DESCRIPTION OF THE DRAWINGS

In the drawings, wherein like elements are referenced alike,

FIG. 1 is a perspective view of a semiautomatic frying machine illustrating aspects of the present invention;

FIG. 2 is a side elevational view of the frying machine of FIG. 1;

FIG. 3 is a top plan view of the frying machine of the preceding Figures;

FIG. 4 is a side elevational view similar to that of FIG. 2 but with the external, side cover removed;

FIG. 5 is a front elevational view of the machine of the preceding Figures, shown with the front panel thereof removed;

FIG. 7 is a fragmentary plan view on an enlarged scale of the right-hand portion of FIG. 6 looking in the direction of the arrows alone line 7—7 thereof;

FIG. 8 is an elevational view on an enlarged scale of the right-hand portion of FIG. 6, looking in the direction of the arrows along line 8—8 thereof;

FIG. 16 is a cross-sectional view showing the direction of air flow currents through the filter of FIG. 13;

FIG. 17 is a perspective view of an air filter cartridge forming a portion of the air filtering system of the preceding FIGS.; and FIG. 18 is an exploded perspective view of the cartridge of FIG. 17, shown in conjunction with a prefilter.

DETAILED DESCRIPTION OF THE PREFERRED EMBODIMENT

Figure 6:
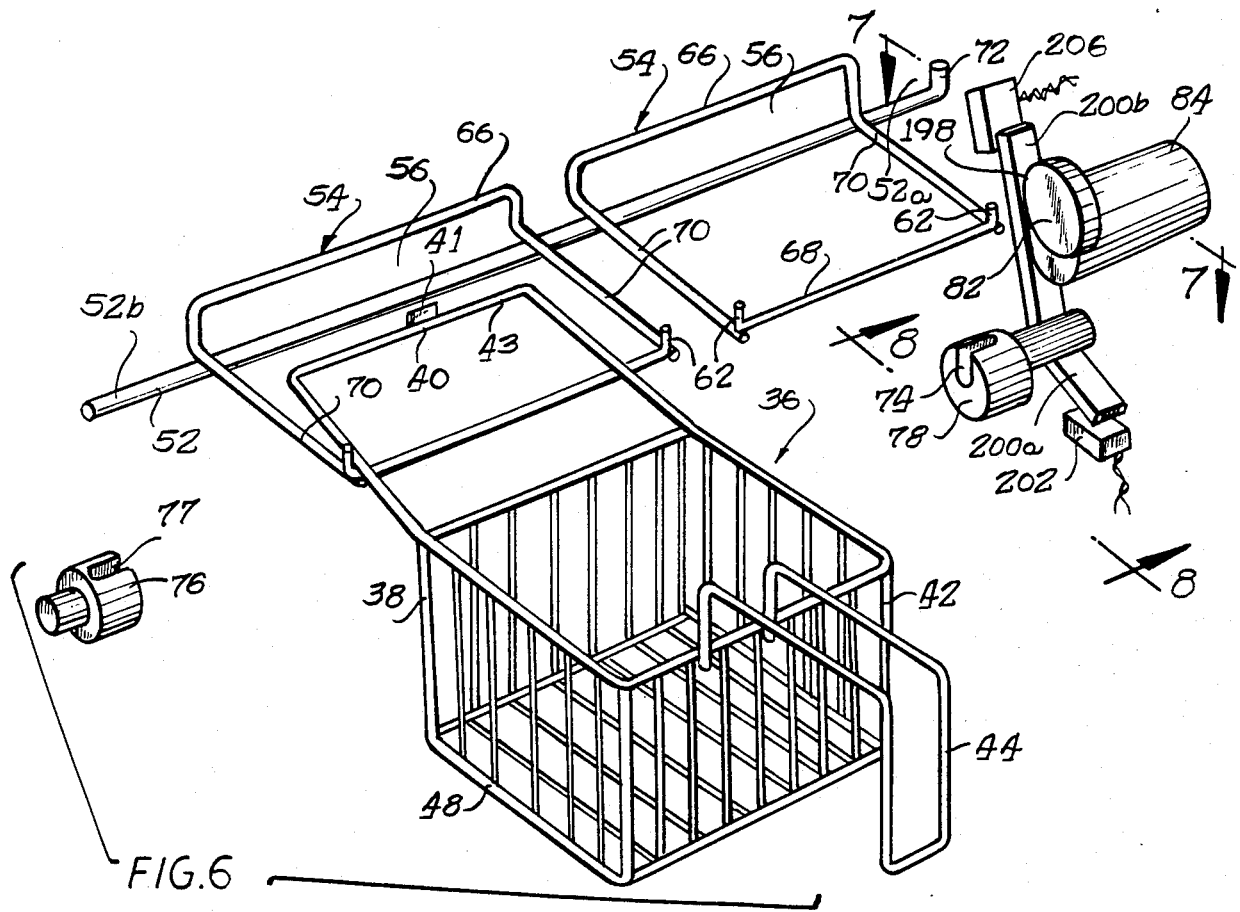
FIG. 6 is an exploded perspective view of a food-carrying basket and basket-supporting drive system therefor, as used in the machine of the preceding Figures.

Referring now to the drawings, and initially to FIGS. 1-4, a frying machine 10 includes an external metal cabinet 12, preferably formed of stainless steel. The frying machine 10 is preferably fully self-contained, suitable for countertop operation and, according to one aspect of the present invention, does not require a custom installation such as that wherein equipment is typically mounted into a countertop, underneath a vent hood, or requires additional structure for a floor or wall-mounted installation. Referring to FIG. 1, major components of the frying machine include an upper ventilation portion accessible through an upper door 14 and an isolated cooking unit accessible through another, lower, door 16. Controls and various safety features are located in a separate side-mounted panel 18, separated from the cooking unit by a sidewall 22. Included among the safety features is a fire extinguisher 20 and control circuitry mounted on the sidewall 22 of cabinet 12. The frying machine 10 is fully ventilated, having an air intake screen 24 and discharging filtered air through a louvered roof 26 (see FIG. 3). As seen most clearly in FIG. 2, the bottom of cabinet 12 includes rubber support feet 28 which enable the frying machine to be placed on a counter surface 30 (see FIG. 2) without incurring risk of marring the countertop surface. Installation of the frying machine is completed by merely plugging the machine into a source of electrical power. A conventional electrical plug 32 (see FIG. 14) is provided for this purpose and is connected to the components of the frying machine through an electrical cable 34. (See FIG. 4.)

Figure 9:
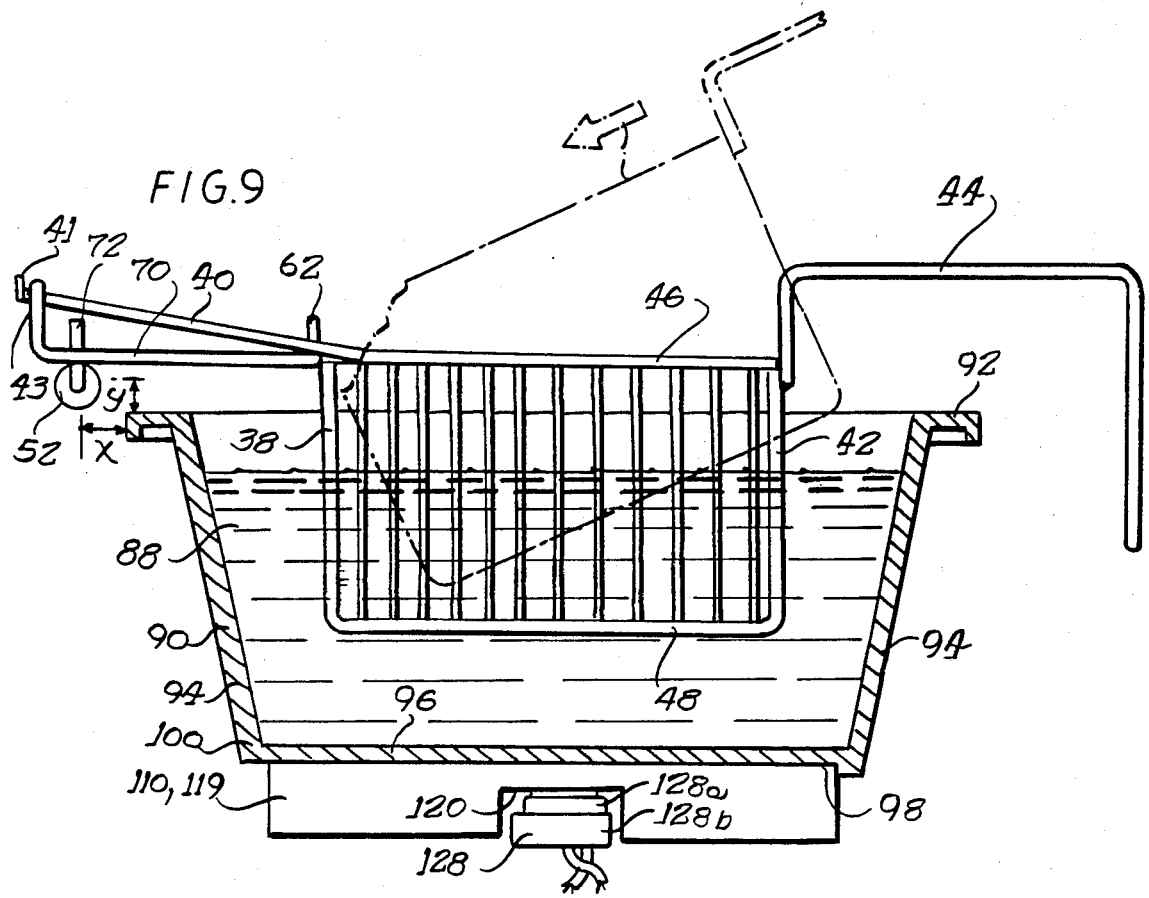
FIG. 9 is a cross-sectional elevational view taken substantially along the line 9—9 of FIG. 5 and looking in the direction of the arrows.

As will be seen, the frying machine according to principles of the present invention, provides semiautomatic operation and is particularly suitable for preparing individual-sized portions on demand. One or more baskets carrying the food to be cooked are automatically lowered into a vat of cooking oil, shortening, heated fat or the like cooking medium, and after immersion therein for a predetermined time-temperature interval, the basket is raised to prevent overcooking of the food contents therein. Referring to FIGS. 6 and 9, a basket 36 is preferably formed of an open wire framework having a generally forward end 38 with a loop-like mounting lip 40 generally upwardly inclined from an upper surface of the basket, and a rearward end 42 having a handle 44 graspable by the user to mount the basket to the frying machine. Illustrated in FIGS. 6 and 9 is an optional, generally upstanding tooth-like locking tab 41, preferably comprising a metal tab welded, brazed or otherwise secured to the transverse rail portion 43 of mounting lip 40. With reference to FIG. 9, the basket 36 preferably has a preselected height between its upper surface 46 and a lower end 48 comprising the lower or bottom endwall of the basket.

Referring now to FIGS. 5–9, a basket-supporting shaft 52 includes a pair of laterally spaced-apart lip-engaging cradles 54 transversely mounted to shaft 52 by welding, brazing or other expedients. The cradles 54 are comprised of a generally open frame-like structure defining apertures 56 through which the basket lip 40 is inserted as the basket is moved in a generally forward direction. The forward portions of cradles 54 include a pair of generally upright guide pegs 62 at each end of a lower support bar 68 which help to guide the basket lip, prevent lateral misalignment of a basket lip 40 as the lip is inserted through aperture 56. Located at the rear of cradles 54 is generally horizontal upper support bar 66. Thus, when lip 40 is fully inserted in the basket cradle 54, the upper forward portion of lip 40 (and optional tab 41, if provided) engages the underside of support bar 66, while the rearward lower portion of lip 40 engages the upper surface of the lower support bar 68, with the weight of basket 46 and contents therein maintaining the basket lip in secure engagement with the support bars 66, 68 of the lip-engaging cradle 54. In the preferred embodiment, as illustrated in FIG. 9, the side arms 70 are generally horizontal while the basket lip 40 is generally upwardly inclined, as noted above. Other arrangements are, of course, possible. For example, a "double-basket" can be provided having a width twice that shown in the drawings so as to resemble, in plan view, two baskets 36 placed side by side, joined to have a common food-receiving cavity with a pair of lips 40 at each lateral end of its forward portion.

To mount a food-carrying basket 36 for rotation with basket-supporting shaft 52, a user need merely grasps the basket by its handle 44 and insert the forward lip 40 thereof in cavity 56, by moving the basket in a generally forward direction. Because of the arrangement of cradles 54 and the assistance provided by guide pegs 62, engagement of the basket with cradles 54 is quickly and easily accomplished. As can be seen with reference to the front elevational view of FIG. 5, the cabinet surrounding the cooking vessel and the food-carrying baskets is quite small, and accordingly a particular advantage of the present invention is that the baskets are mounted at their forward ends without requiring a user to incline the basket away from a customary generally level position, or to move the basket to some other unusual attitude or position. This requires a user to insert only a minimal amount of his hands and arms in the cabinet 12, presenting a particular advantage over handle-mounted baskets.

Referring especially to FIGS. 5 and 6, the right-hand, driven end 52a of basket-supporting shaft 52 is generally L-shaped, having an upturned leg 72 at the free end thereof. The L-shaped end 52a of shaft 52 is received in generally vertically extending pocket-like recess 74 formed in the right-hand mounting disk 78. A similarly configured left-hand mounting disk 76 is provided with a recess 77 for receiving the generally stub-like cylindrical end 52b of shaft 52. In the preferred embodiment, the left-hand mounting disk 76 is rotatably mounted by roller or slide bearings to sidewall 80 of cabinet 12 (see FIG. 5) so as to follow the rotation of shaft 52 when driven from its opposite, right-hand end 52a.

Referring additionally to FIGS. 7 and 8, mounting disk 78 is mounted to the shaft 81 of an electrical motor 84 (see FIG. 7). The motor 84, as will be seen, is preferably nonreversible. As the motor 84 is energized, the output shaft 81 thereof rotatably drives an elliptical cam 82, which deflects the legs 200a, 200b of a generally L-shaped actuator 200 to which the shaft 79 of right-hand mounting disk 78 is secured. As will be seen, cam 82 contacts actuator 200b to drive the mounting disk 78 in a direction which rotates the basket-supporting shaft received therein in a direction for the raising the basket out of the cooking vessel. Thereafter, when it is desired to lower the basket in the cooking vessel, rotation of the motor continues so that a low spot on elliptical cam 82 contacts leg 200b to allow controlled lowering of the basket under the force of gravity. Shaft 52 is thereby mounted for rotation in opposite directions. The right-hand end 52a is driven for rotation which raises the basket with the left-hand end 52b following rotation of the shaft. Rotation of shaft 52 in an opposite direction under the force of gravity is decelerated in a controlled manner by the rotary braking of the motor, with the left-hand end 52b of the shaft again following rotation of the right-hand end 52a as the basket is lowered. Motor-driven rotation and braking of shaft 52 will be discussed below in greater detail.

Referring to FIG. 9, as shaft 52 is rotated in a counterclockwise direction, the basket-supporting cradle 54 welded thereto is likewise rotated therewith so as to sweep the same angular displacement. Baskets mounted in the cradles 54 are thereby elevated away from a heated cooking medium 88 disposed in a pot-like cooking vessel 90. The vessel 90, as illustrated in FIG. 9, has an upper lip 92 and sidewalls 94 which extend below a bottom wall 96, so as to form a downwardly-opening recess 98. Preferably, the lower rear corner 100 of vessel 90 forms an outside corner with bottom wall 96, and is not enclosed by the sidewall to form a portion of recess 98. With brief reference to FIGS. 11 and 12, a heating unit 110 has a generally planar rectangular upper surface 112 with downwardly-depending sidewall surfaces 114. The recess 98 formed in the bottom of vessel 90 receives the upper portion of heating unit 110, with the rear wall of vessel 90 being open to provide ready sliding insertion of the vessel over the upper heating surface. As can be seen in FIG. 5, the vessel 90 is inserted in a relatively close-fitting cabinet portion, and, as with the improved mounting of the food-carrying baskets 36, the vessel 90 is also quickly and easily inserted in its proper place with a simple forward motion toward the rear wall 116 of cabinet 12 (see FIG. 5). As those who are familiar with maintaining and operating food surfaces are aware, it is highly advantageous to have food-carrying members such as vessel 90 readily removable for cleaning at a remote location.

Figure 10:
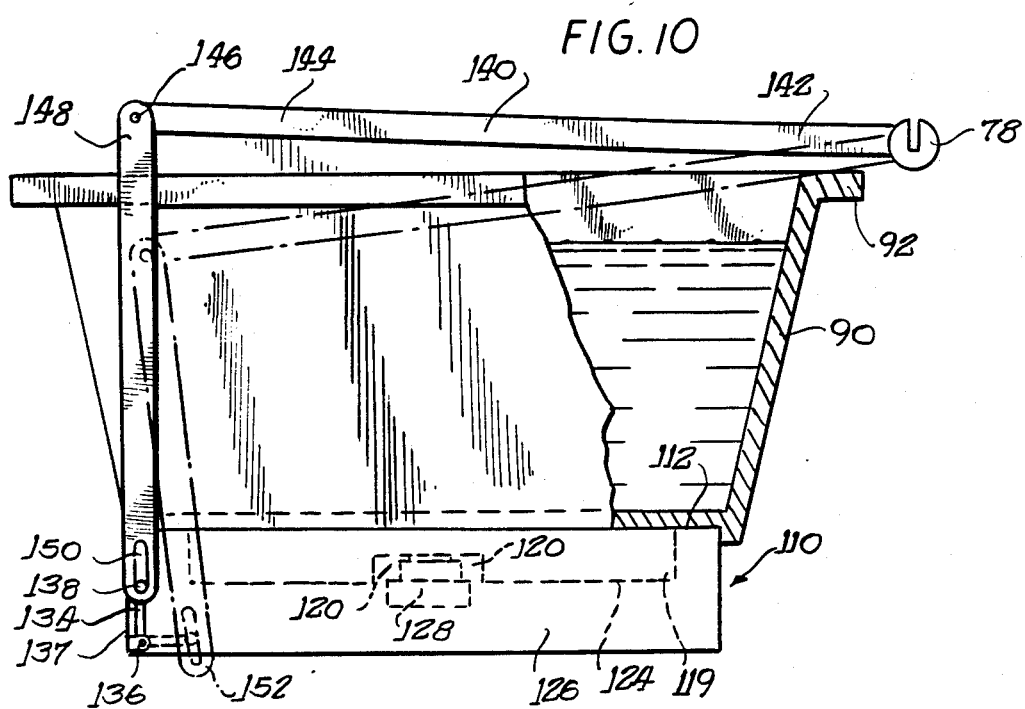
FIG. 10 is a cross-sectional view taken substantially along the line 10—10 of FIG. 5 and looking in the direction of the arrows.
Figure 11:
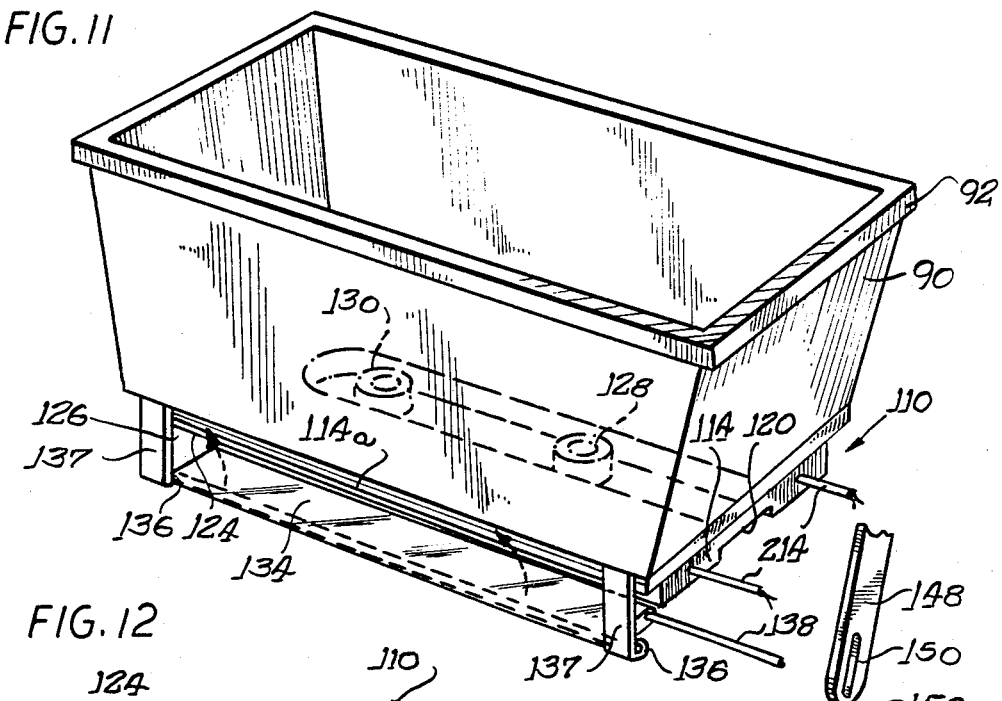
FIG. 11 is a perspective view of the heating plate and working vessel portions of the frying machine of the preceding Figures.
Figure 12:
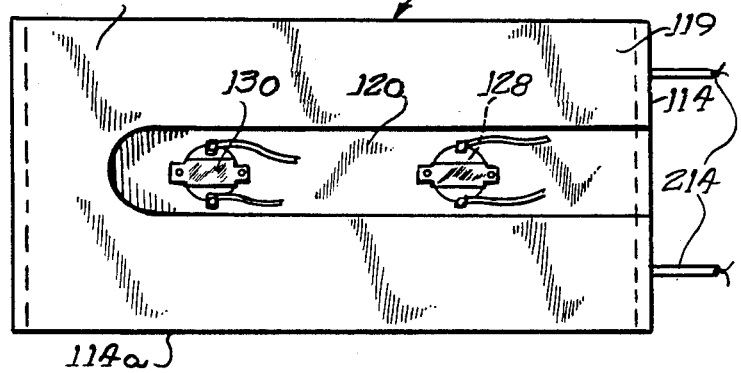
FIG. 12 is a bottom plan view of the heating plate of FIG. 11.

Referring now to FIGS. 10–12, heating unit 110 is preferably formed of an integral plate-like casting 119, generally rectangular in configuration, except for a downwardly opening elongated finger-like recess 120, which preferably extends in a lateral direction toward the right-hand sidewall 22 of cabinet 12, that sidewall interfacing between the interior of the cabinet and the side-mounted control unit 18. Referring to FIG. 5, outwardly-extending rails or legs 122 engage the lateral sides of heating unit 110 to elevate the bottom surface 124 above the floor of cabinet 12 so as to form a cavity 126 therewith. The cavity 126 communicates with the recess 120, the walls of the recess forming a continuous surface with the bottom surface 124 of the heating unit. Disposed within recess 120 are two temperature sensors 128, 130 which, as indicated in FIGS. 9 and 10, have a lower free end (128b, for example) protruding slightly below the bottom surface 124 of heating unit 110, so as to extend into cavity 126. Referring especially to FIG. 9, the preferred temperature sensor of the present invention will be described with reference to the one temperature sensor 128, it being understood that the other temperature sensor 130 is substantial identical thereto, but for a different temperature operating range. The sensors are commercially available as type 49T, offered for sale by THERM-O-DISC, INCORPORATED of Mansfield, Ohio. Temperature sensor 128 is preferably of the snap disk type, having a temperature-sensitive bimetal disk operating a set of internal contacts. The temperature sensor 128 has an insulative body 128b of ceramic or other heat-resistant material. Mounted atop body 128b so as to protrude thereabove is a metallic sensor portion 128a, having a circular metallic face for contacting the plate-like casting 119 so as to be in thermal conduction therewith, indirectly sensing the temperature at the upper surface of the casting which supports vessel 90. The temperature of the cooking medium can thereby be inferred from the temperature readings of sensors 128, 130. As will be described herein, the inference of the temperature of the cooking medium is preferably modified or compensated to provide the initial heat energy at the onset of a cooking cycle so as to overcome transient cooling of the cooking medium when frozen or lukewarm food is initially inserted in the cooking medium, thereby substantially lowering the temperature thereof.

Temperature compensation is preferably provided by a temperature-compensating door 134 which is mounted so as to partly enclose cavity 126 adjacent the forward edge 114a of heating unit 110. Door 134 is mounted at each end with hinges 136, attached to heating unit 110 with brackets 137. Door 134 includes an outwardly-extending actuator pin 138 at its upper free end which, as will be seen, is connected to linkage operating the door between an upper, closed position and a lower, opened position. In the closed position, door 134 blocks the cavity 126 at the frontal edge 114a of the heating unit. As will be seen, air circulation means draws air into cabinet 12 through the intake screen 24, thereby directing air through cavity 126, underneath heating unit 110, and more particularly across the lower ends of temperature sensors 128, 130, thereby assuring a controlled source of ambient air over the insulative body portions of the temperature sensors during a cooking cycle. According to one feature of the present invention, the introduction of ambient air flowing across the insulative ceramic body portion of the temperature sensor has been found to provide a beneficial compensation providing added heat input during the initiation of a cooking cycle. With the temperature sensors mounted in the recess of the heating unit so as to be almost entirely disposed therein, cooling air through cavity 126 contacts only the lower, exposed ends of the temperature sensors, rather than their upper, metallic sensing portions which are in direct thermal contact with the bimetallic disk. As will be explained herein, the observed effect upon the temperature sensors is to provide a reduced operating range therefor, a commercially-important feature, since economical temperature sensors having limited operating ranges are not available.

The linkage which operates door 134 preferably comprises a generally horizontally-extending cantilever linkage arm 140 having a rearward end 142 welded, brazed or otherwise secured to the motor-connected mounting disk 78. Arm 140 accordingly travels with the disk and the basket-carrying shaft 52 attached thereto throughout the full angular displacement thereof, which raises and lowers basket 36 out of and into contact with the cooking medium disposed in vessel 90. The front free end 144 of arm 140 is connected through a hinge pin with a second, generally downwardly-extending linkage arm 148 having an elongated slot 150 at its lower end 152. Pin 138 is received in slot 150 so that, when the basket-carrying shaft 52 is rotated in a direction which raises basket 36 away from vessel 90, the second linkage arm 148 assumes a generally vertical position with the bottom end of the elongated slot 150 raising pin 138 to an uppermost position, which causes door 134 to pivot about its hinge pin 136, thereby closing off air flow into cavity 126 from the forward end thereof adjacent the front of cabinet 12. Since the lateral sides of heating unit 110 are relatively close to the sidewalls of cabinet 12, air flow is effectively prohibited from entering cavity 126 when door 134 is in its upper, closed position.

When rotation of motor 84 is continued, the displacement direction of shaft 52 is reversed, with baskets 36 carried thereon being lowered into vessel 90 to initiate the beginning of a cooking cycle. As mounting disk 78 lowers basket 36, the first linkage arm 140 is also downwardly rotated, thereby driving the second linkage arm 148 in a downward direction. The downward displacement of the second linkage arm 148 continues with continued rotation of mounting disk 78 until pin 138 contacts the upper end of elongated slot 150. Thereafter, further downward displacement of the second linkage arm 148 is accomplished by rearwardly displacing the bottom end of the second linkage arm 148, thereby causing pin 138 carried in elongated slot 150 to swing in a rearward direction, so as to lower door 134 to an open position. With door 134 opened, air flowing through cabinet 12 is able to pass in a rearward direction underneath the frontal edge 114a of heating unit 110, traveling to the temperature sensors 128, 130. As can be seen, door 134 is automatically raised and lowered as food-carrying baskets 36 are raised and lowered during the course of a cooking cycle.

Figure 14:
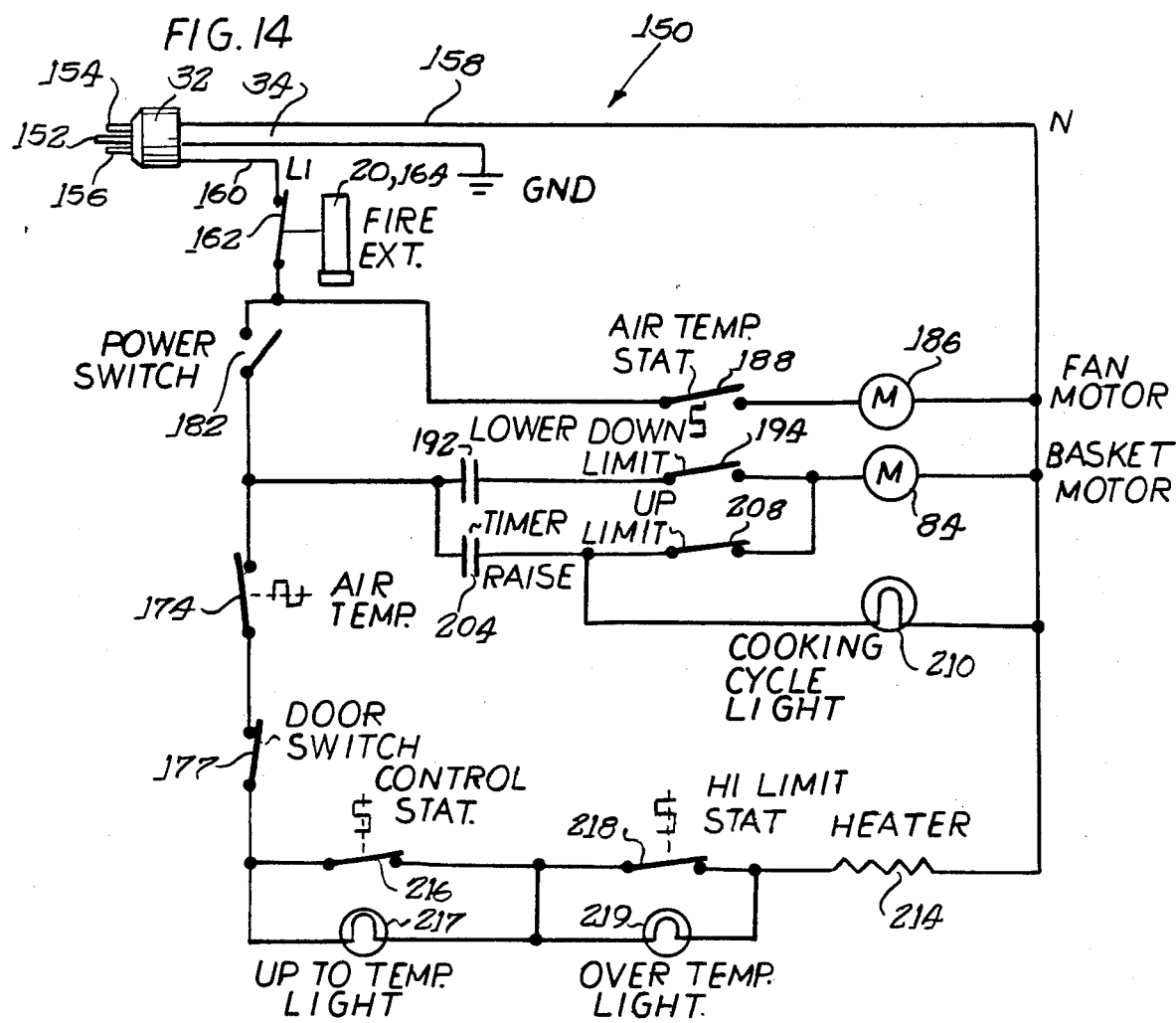
FIG. 14 is a schematic diagram of a first embodiment of the electric circuit portion of the machine of the preceding Figures.

Referring now to FIG. 14, there is shown a schematic diagram of a first embodiment of an electrical operating circuit, generally designated at 150, for the frying apparatus. Plug 32, as mentioned above, is of a conventional design receivable in an electrical outlet receptacle of any suitable operating voltage, but preferably a nominal operating voltage of 120 volts. A central pin conductor 152 is connected to an electrical ground to thereby ground the cabinet 12 and components contained therein. The prong 154 connects the plug to the line supply of a 120 volt supply circuit (not shown) in a conventional manner. A neutral leg 158 of circuit 150 is generally connected to one side of the various electrical components of the frying apparatus. The other leg 160 of circuit 150 is connected through a single-pole, single-throw switch 162, which is actuated in response to a sensor 164 for sensing operable and inoperable conditions of fire extinguisher 20. Sensor 164 preferably comprises a pressure sensitive switch which closes the contacts of switch 162 when fire extinguisher 20 is charged with a minimum operating pressure. However, should the pressure of fire extinguisher 20 fall below a specified minimum amount, the preferred sensor 164 causes the contacts of switch 162 to open, effectively de-energizing or "locking out" the various components of the frying apparatus. Thus, the arrangement of switch 162 and sensor 164 in conjunction with fire extinguisher 20 comprises a safety feature particularly useful when the frying apparatus is operated by personnel who are not specifically knowledgeable regarding the various operating conditions of the frying apparatus.

Fire extinguisher 20 has a discharge horn 168 which directs fire-extinguishing material across the surface of vessel 90, and into the interior of cabinet 12. A discharge of fire-extinguishing material is initiated upon an over-temperature condition sensed by a third temperature sensor 170 mounted to the interior side of sidewall 22 above the discharge horn 168. Over-temperature sensor 170 is connected through wires 172 to a valve 174 (see FIGS. 2 and 4) which releases or discharges fire-extinguishing material through horn 168. The over-temperature sensor 170 also controls a single-pull, single-throw switch 174 which interrupts power flowing to the heating unit 110. A safety switch 176, having contacts 177 located immediately downstream of switch 174, also interrupts power flow to the heating element of heating unit 110 when the front panel of the cabinet is loosened. For controlled operation, a master on-off switch 180 located on the front of control panel 18 controls switch contacts 182 interrupting power to all of the various components of circuit 150 except for a motor 186, which is automatically controlled by an air-temperature thermostat 188 operating to prevent heat buildup within the enclosed cabinet 12. If desired, a switch can be provided to de-energize fan motor 186 when very high temperatures are sensed, indicating a fire condition in which it is desirable not to have air circulation over the heating unit and cooking vessel, which would thereby provide oxygen to any fire that may exist there.

Referring to FIGS. 1, 4 and 5, a timer 190 is manipulated by a user to indicate the desired cooking time during which the food-carrying basket is lowered into the cooking medium contained in vessel 90. Referring additionally to FIGS. 7, 8 and 14, as the timer 190 is manipulated to indicate the initiation of a cooking cycle, contacts 192 of circuit 150 are closed, with motor 84 drawing power through down-limit switch 194. Motor 84 rotates cam 82 in a clockwise direction so that the protruding portion or major axis of the cam 82 contacts leg 200b, thereby driving the generally L-shaped leg 200 in a counterclockwise position as indicated by arrow 201. This in turn drives mounting disk 78 in a counterclockwise position so as to raise baskets 36, bringing the baskets out of contact with the cooking medium in vessel 90. Rotation of motor 84 continues until the major axis of cam 82 approaches the free end of leg 200b, whereupon the upper limit switch 206 is actuated by contact with leg 200b. This in turn opens contacts 208, energizing basket motor 84 and terminating a cooking cycle of apparatus 10. Thereafter, when another cooking cycle is initiated, uncooked food is loaded into basket 36 and the basket is mounted onto the cradles 54 of shaft 52. This applies a torque to shaft 52 which would tend to lower the baskets under the force of gravity, were it not for the contact between leg 200b and the high point or major axis of cam 82. As timer 90 is set to determine the duration of a cooking cycle, contacts 192 are closed, and with the contacts 194 of down-limit switch 202 also closed, motor 84 is again energized to continue rotation in a clockwise direction. This causes leg 200b to come into contact with the minor axis or "low" spot on cam 82, allowing actuator 200 and mounting disk 78 to rotate in a clockwise direction, which corresponds to a lowering of basket 36 in vessel 90.

Motor 84 does not drive basket 36 to its lowered position, rather the motor acts as a brake controlling the rotation of cam 82 which impedes rotation of shaft 52 under the force of gravity, owing to the torque applied by the weight of basket 36 and the contents loaded therein. As leg 200b begins to contact the low spot, or minor axis, of cam 82, leg 200a is lowered into contact with the down-limit switch 202, thereby opening contacts 194 so as to de-energize motor 84 with basket 36 in its lowermost position. During this time, leg 200a of actuator 200 contacts the limit switch 202, providing a second stop limiting further lowering of basket 36 if the motor 84 of cam 82 otherwise fails to provide such limiting. It is generally desirable, however, that the basket 36 and its mounting shaft 52 be totally controlled by rotation of motor 84, rather than relying upon the contact between the legs of actuator 200 and their associated limit switches. As can be seen, motor 84 is driven in a single direction and is toggled between energized and de-energized states every 180° of rotation thereof.

Timer 190 continues to count down until the desired cooking time has elapsed, whereupon contacts 204 are closed to energize motor 84 for continued rotation, since leg 200b has been raised out of contact with the upper limit switch 206, thereby closing the contacts 208. With timer contacts 204 closed, current is also driven through cooking cycle light 210, indicating that a cooking cycle is about to be terminating. As power is again applied to motor 84, clockwise rotation of its cam 82 continues, advancing the major axis of the cam toward the free end of leg 200b, thereby rotating shaft 52 so as to raise basket 36 out of contact with the cooking medium in vessel 90. The cooking cycle light 210 could also be connected downstream of timer contacts 192, indicating that a basket is being lowered into a cooking medium. The cooking light 210 would remain illuminated until the timer has counted down through its preset range, whereupon contacts 192 are opened and contacts 204 are closed to initiate raising of the basket. It is generally preferred that cooking cycle light 210 be illuminated during the cooking of food in basket 36, when the basket is lowered into the cooking medium. Accordingly, the second alternative arrangement, where cooking light 210 is connected downstream of timer contacts 192, is preferred.

Heating unit 110 contains an internal, electrical heating element 214 embedded within the plate-like casting 119. Heating element 214 is indicated in the lower right-hand portion of the schematic diagram of FIG. 14, and is energized when both switches 216, 218 located immediately upstream thereof are closed. Switch contacts 216, 218 are controlled by temperature sensors 128, 130, respectively (see FIGS. 11 and 12). Switch contacts 216 of temperature sensor 128 are closed when an undesirably low temperature is detected. As switch contacts 216 are closed, heater 214 is energized, thereby heating the cooking medium contained within vessel 90, placed in thermal contact with the upper surface 112 of the plate-like casting 119. Power is applied to heater 214, with the temperature of the cooking medium being continuously raised until the desired operating temperature of the cooking medium is attained, whereupon contacts 216 open to prevent further heating of the cooking medium. Thus, the switch contacts 216 of temperature sensor 128 open and close to maintain the desired operating cooking temperature of the media in vessel 90. An indicator lamp 217 is illuminated when the switch contacts 216 open, indicating that the cooking medium in vessel 90 is raised to the desired cooking temperature, ready for a cooking cycle to begin. Any small over-temperatures developed in the heating unit 110 or in the vessel 90 are sensed by temperature sensor 130, which operates to open switch contacts 218, thereby de-energizing heater 214 until the over-temperature condition has been corrected.

Upon closing of switch contacts 218, control of heater element 214 is essentially maintained by the temperature sensor 126, which functions as a thermostat to open and close switch contacts 216. When the high limit temperature sensor 128 senses an over-temperature temperature light 219 is illuminated, apprising the operator of the over-temperature condition. As mentioned above, the temperature sensor 130 responds to relatively small over-temperature conditions. High excessive temperatures are detected by sensor 170 which, as explained above, operates to open switch contacts 174, thereby de-energizing heating element 214 at point in circuit 150 upstream of the thermostat switch contacts 216, 218, thereby causing the circuit to override or otherwise disregard the operational conditions thereof.

Figure 15:
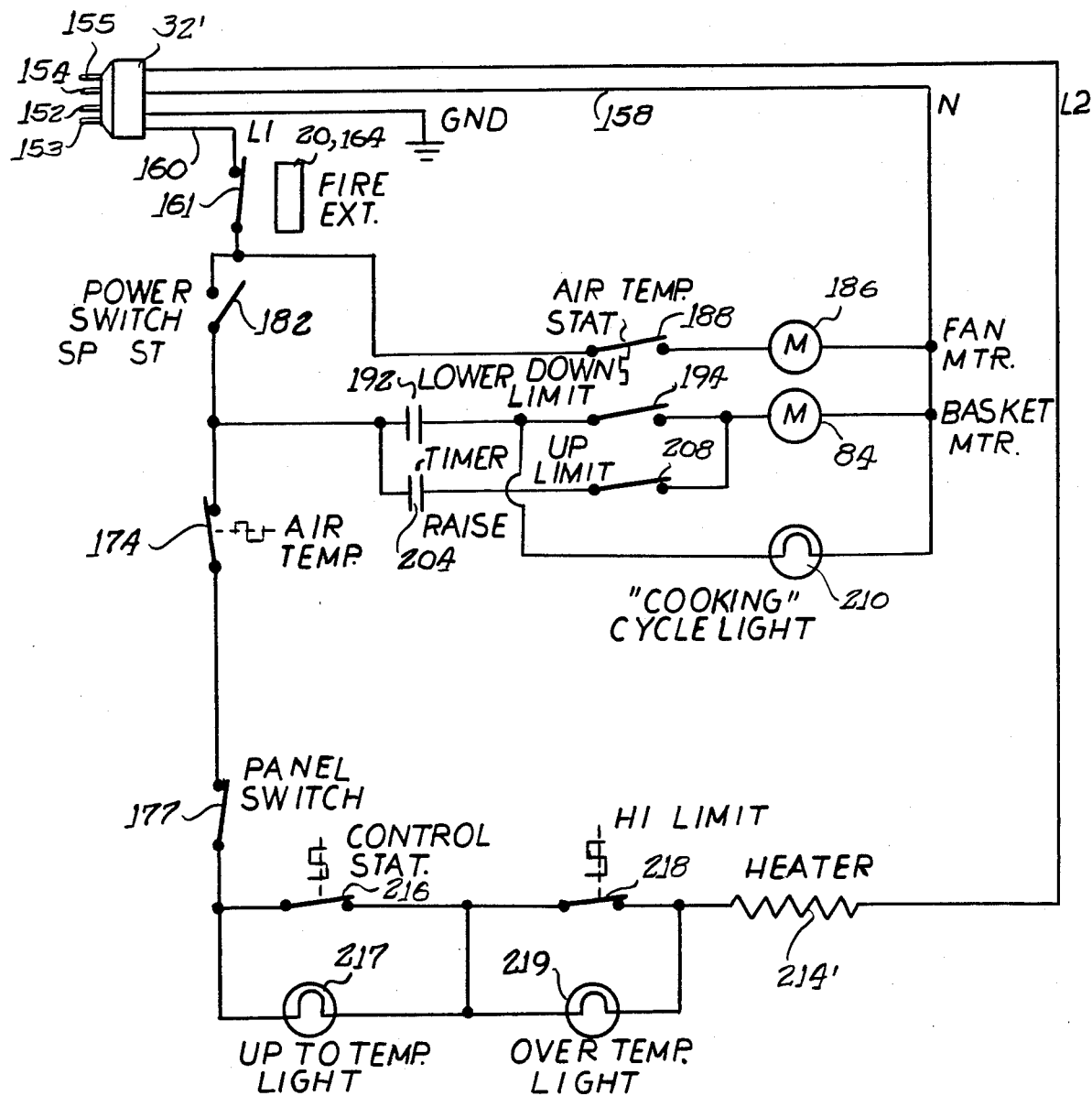
FIG. 15 is a schematic diagram of a second embodiment of the electric circuit portion of the machine of the preceding Figures.

Referring now to FIG. 15, the second embodiment of the electrical circuit portion of the frying apparatus will be described. The schematic diagram of FIG. 14 describes a lower voltage, preferably a 120 volt, operating circuit. FIG. 15 is directed to a higher, 240 volt operating circuit. The circuits of FIGS. 14 and 15 are substantially identical, except that the heater 214' of FIG. 15 is not connected to the neutral leg of the circuit, as in FIG. 14, but rather is connected to a second line conductor $L_2$. Thus, the heater 214' of FIG. 15 is connected across the legs $L_1$, $L_2$ of a 240 volt circuit. However, all other connections of FIG. 15 are identical to those described above with respect to FIG. 14, wherein the motors 84, 186 and the cooking cycle light 210 are connected to a neutral conductor 158. The plug 32' of FIG. 15 is of a four-conductor type having a prong 152 for connection to a circuit ground and a prong 154 for connection to a circuit neutral. The remaining two prongs 153, 155 are connected to the legs of a 240 volt winding of a distribution transformer (not shown). For cooking units of comparable size, the higher voltage 240 volt heater element is desired when quicker recovery time is needed. An example of such need arises when many cooking cycles are required in a relatively short time. Heretofore, available choices were limited to purchasing additional cooking units, allowing some of the units to remain idle as the temperature of the cooking oil is recovered, or to employ higher voltage heating coils which can absorb greater electrical energy so as to reduce their recovery time. However, the additional investment in a higher wattage heating coil is not otherwise cost efficient, as cooking oil and other cooking media are typically limited in the amount of energy input they can withstand without burning or other degradation. Thus, the advantage resulting from the increased investment of a higher voltage fryer apparatus is limited for the most part to a more rapid recovery of the operating temperature. As will be seen, the air flow temperature compensation of the present invention provides quicker recovery times without requiring higher voltage heating units. This is particularly advantageous in many applications where higher (i.e., 240 volt) voltages are not available. For example, most domestic kitchens and many commercial kitchens are wired only for 120 volt service. With the airflow temperature compensation of the present invention, operators need not install additional machines to handle high cooking volumes.

A particular advantage of the present invention is that the cooking vessel 90 is removable from the heating unit 110, and does not contain any internal components, particularly components of the heating unit, such as heating elements or temperature sensors. Accordingly, the cooking vessel is adapted for easier, simple cleaning and maintenance. This represents an improvement over prior art cooking vessels incorporating electrical connections and temperature sensors in their bottom portions. It has been observed, over time, that cooking oil would occasionally travel down the sidewalls of the cooking vessel and eventually migrate to the electrical connections or temperature sensors, thereby impairing the low resistance integrity of the electrical connections and interfering with the proper operation of the temperature sensors. To provide further protection against heated cooking oil and the like traveling down the sidewalls of cooking vessel 90, and possibly migrating to the heating unit disposed therebelow, cooking vessel 90 includes an outwardly-extending peripheral lip 92. A Further advantage of providing a cooking vessel completely devoid of internal components and readily separable from the heating unit is that the pot-like cooking vessel can easily be exchanged for other types of cooking vessels. For example, the vat-like vessel 90 can be exchanged for a griddle of the type used for frying hamburgers or other foods.

Operation of the fryer apparatus will now be described. Initially, at the beginning of a time period during which the fryer apparatus is to be operated, the cabinet door is closed and the master switch 180 is turned to an operating position, thereby energizing heater 214, assuming that switch contacts 216, 218 are in a closed position, which is to be expected during normal startup after a prolonged cool-down period. Initially, the basket and its supporting shaft are rotated to an upper or withdrawn position wherein baskets 36, if mounted in the cradles 54 of shaft 52, are elevated above cooking vessel 90. An operator, after placing the desired food portion in a dismounted basket 36, grasps the basket by its handle 44 and with a generally straight-line forward motion, inserts basket lip 40 in recess 56 of the cradle-like carrier 54. This phase of the operation represents a significant improvement over prior art basket-mounting arrangements, it being appreciated that an operator is reaching into a small, confined space within cabinet 12 immediately above a vessel of heated cooking oil, with a potential of frost or other moisture-bearing particles falling into the heated oil. It is therefore desirable that the basket be mounted and the operator's hand withdrawn from the interior of cabinet 12 as quickly as possible.

With the simple, forward "staking-like" mounting of the basket accomplished, an operator turns the dial of timer 190 to a desired cooking period. Thereupon, contacts 192 are closed and motor 84 is energized, thereby allowing controlled rotation of shaft 52 and lowering basket 36 into contact with the cooking medium. As explained above, rotational displacement of shaft 52 to lower basket 36 is accompanied by the lowering of air-temperature compensating door 134. Since fan motor 186 is energized upon start-up, and continuously draws air through cabinet 12, ambient air is directed over the lower bodies of temperature sensors 128, 130, which assures maximum heating and quick recovery of the desired cooking temperature of the cooking medium in vessel 90. As motor 84 continues to lower basket 36 when the basket approaches its downwardmost position, the leg 200a of actuator 200 trips the down-limit switch 202 (see FIG. 4) to open contacts 194 (see FIG. 14), stopping further rotation of the motor. As mentioned, leg 200a dwells or rests on the up-limit switch 202. During the cooking cycle, timer 190 continues to run until the desired cooking time has elapsed. Thereupon, the timer closes contacts 204 (see FIG. 14), energizing motor 84 for continued rotation of the cam, which raises basket 36 out of vessel 90.

With "upward" rotation of the basket-supporting shaft, linkage arm 148 is swung to a near-vertical position, thereby closing temperature-compensating door 134, ceasing temperature compensation of sensors 128, 130. As basket 36 approaches its desired upwardmost position, the eccentric cam 198 mounted to motor 84 presses the other leg 200b of actuator 200 against the up-limit switch 206, thereby opening switch contacts 208 and de-energizing motor 84 against further upward rotation. During the time that the baskets are being raised, lamp 210 is illuminated to indicate to an operator that the cooking period has been completed and that the basket is being returned to its upward, retracted position. Thereafter, the food-carrying baskets 36 are removed with a simple straight-line rearward motion by grasping handle 44 and pulling the basket in a rearward direction.

As explained above, air flow across temperature sensors 128, 130 provides maximum initial heating and rapid temperature recovery of the cooking medium in vessel 90. In addition, the temperature compensation providing air flow across temperature sensors 126, 128 allows the thermostat sensor 216 to operate within a narrower range than that normally available. This is very advantageous in a commercially competitive cooking apparatus since thermostats of narrower range have heretofore been unavailable. For example, one practical embodiment of a temperature sensor 128, the above-mentioned type 49T, available from THERM-0-DISC INCORPORATED of Mansfield, Ohio has the contacts 216 thereof set to open at 385° F.±10° F. and to close at 350° F. ±15° F. According to testing conducted on prototype units, closing of the contacts 216 thereof occurs, with air flow temperature compensation, at approximately 365° F., providing a narrower, generally 20° F., operating range. This in turn is highly desirable in preparing foods which respond optimally to a single operating temperature or a very narrow range of operating temperatures. With the air flow compensation of the present invention, relatively inexpensive, commercially available temperature sensors can function as if they had a 20° operating range, rather than their designed 35° operating range.

A further advantage of the selectively-controlled air flow across the temperature sensors is that, if desired, more economical temperature sensors having a less sensitive or slower temperature response can be used. For example, the temperature of the cooking medium is lowered significantly when a basket containing cold or frozen food is inserted in the cooking medium. This drop in temperature may not be sensed by more economical temperature sensors as quickly as may be desired. Compensation is therefore provided by lowering the door 134 to allow air flow past the temperature sensors, which call for increased amounts of heat from the heating unit 110. It has been found that a significant advantage in cooking time and cooking quality is achieved if the initial cool-down of the cooking medium is interrupted as quickly as possible by applying a surge of heating power at the beginning of a cooking cycle. With the air flow control of the present invention provided by door 134 and its associated linkage, economical and efficient compensation for the temperature sensors is provided.

Figure 13:
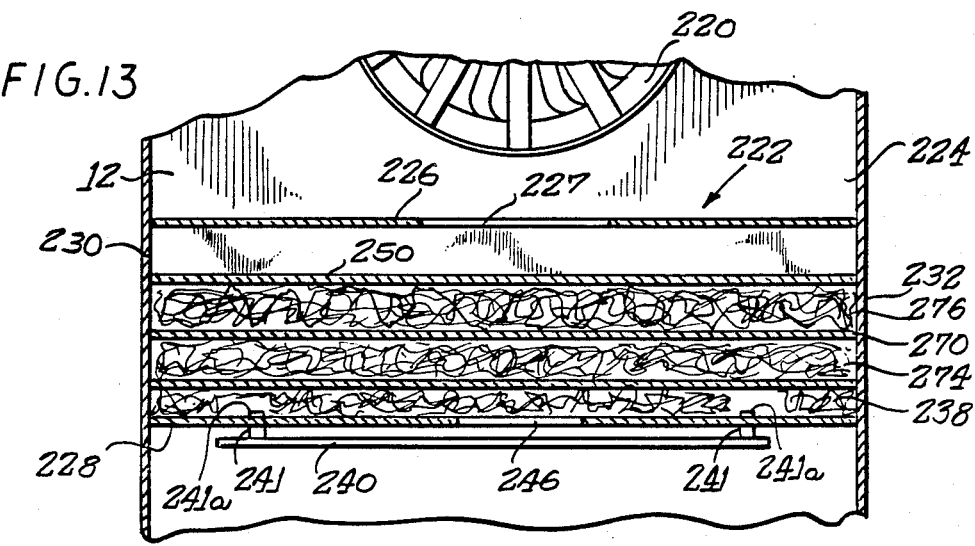
FIG. 13 is a fragmentary cross-sectional elevational view taken substantially along the line 13—13 of FIG. 5 and looking in the direction of the arrows.

As mentioned above, an air flow is maintained in cabinet 12 during operation of the cooking apparatus. The air flow is drawn into the cabinet through an inlet grill 24 (see FIG. 1), and is exhausted through a louvered top wall or roof 26 (see FIGS. 2-5) Referring to FIG. 5, FIG. 13 and FIGS. 16-18, the air flow and filtering systems of the frying apparatus will now be described. Referring initially to FIG. 5, fan motor 186 is located in an upper portion of cabinet 12. Fan motor 186 drives a blower 220 which draws air through cabinet 12 from below, the air entering through the inlet grill 24, and exhausts the air through the louvers in cabinet roof 26 to which the blower is mounted. Located immediately upstream of blower 220 is an air filter module illustrated in FIG. 18 and generally indicated at 222. As illustrated in FIGS. 5 and 13, the filter module 222 is attached to the interior walls of cabinet 12 and when the upper service door 14 of the cabinet is closed, air flow through cabinet 12 is filtered by module 222.

For ease of illustration, the filter module 222 is shown in FIG. 18 as divorced from cabinet 12, although it will be appreciated that the filter module 222 is normally incorporated therein, in a fixed, permanent manner. Filter module 222 includes a baffle plate 240 attached to the lower intake end of chamber 224, and is spaced from the lower endwall 228 thereof by Z-shaped standoffs or spacers 241. Baffle plate 240 is generally solid or imperforate and, being disposed at the inlet end of the filter module, deflects incoming air being drawn through the filter module over the peripheral edge 242 thereof, as indicated by the arrows in FIGS. 16 and 18. The bottom endwall 228 is generally solid or imperforate except for a central aperture 246 which requires incoming air entering the plenum chamber to enter at the central or axial portion thereof, which sets up the air flow for a desirable, protracted or labyrinthian path as it passes through the various stages of the filter unit, as will be described herein.

A prefilter 238 of crushed aluminum or the like is located immediately downstream of endwall 228, and is provided for initial processing of air drawn across cooking vessel and carrying airborne water and cooking medium droplets therein. On opening the upper service door 14 of cabinet 12, entrance is gained to the ventilation chamber 224, and the crushed aluminum prefilter 238 is merely slid along the upper surface of endwall 228. Endwall 228 is, except for its front edge (that edge immediately adjacent the upper service door 14) continuously joined to the side and backwalls of cabinet 12, so as to provide an air-tight seal therewith. Preferably, the upper service door 14 closely engages the remaining fourth edge of endwall 228 so as to complete an airtight seal between the lower cooking chamber and upper ventilation chamber. However, should the upper service door 14 not provide a perfect seal with the front edge of endwall 228, only minor amounts of ambient air will be drawn into the ventilation chamber 224. This represents a particular improvement over prior art ventilated cabinets which drew unfiltered, oil-laden air over a front surface of the exterior cabinet, causing unsightly contamination thereof.

Located immediately downstream of the crushed aluminum prefilter 238 is the filter element 236. Referring to FIGS. 17 and 18, the filter element 236 preferably comprises a discrete self-supporting cartridge. Preferably, the outer walls of the cartridge visible in FIG. 17 including the upper and lower endwalls 250, 252 and the sidewalls 254 may be formed of cardboard or the like, but are preferably made of aluminum sheet. As shown in FIGS. 17 and 18, a plurality of slot-like recesses 258 are provided at the periphery of the upper endwall 250. Similarly, recesses 260 are provided at the outer periphery of the lower endwall 252. Thus, endwalls 250, 252 are joined to the sidewalls 254 through diagonal strap-like webs 264, using economical box-forming construction techniques. As indicated by the arrows in FIGS. 16 and 18, air flow through the filter unit is directed through the slot-like recesses 258, 260. Thus, air entering the filter element 236 is initially located at the center, due to the location of central aperture 246, and travels laterally through the prefilter unit 238 which is preferably formed of an expanded aluminum medium. After traveling laterally through the prefilter 238, air flow is directed around the outer periphery of endwall 252.

Disposed between the endwalls 250, 252 of the filter unit is an interior wall 70 having an internal aperture 272 generally at the center thereof. Disposed between the internal wall 270 and the endwalls 250, 252 are two generally rectangular layers of filter material, preferably comprising an expanded structure of activated charcoal such as a charcoal impregnated expanded plastic medium available from Lewcott Chemical of Worcester, Mass. The filter media, generally provided in rectangular pads, is identified by the upper and lower reference characters 274, 276, respectively. Thus, air flow enters the upstream filter media 274 through the peripheral edges internal of endwall 252, and is constrained to travel generally transversely through the filter media 274 to reach the central aperture 272 of internal wall 270. Thereafter, air leaving the central aperture 272 must travel generally transversely through the downstream filter media 276 to reach the outer periphery of the upper endwall 250, so as to flow through the slot-like recesses 258 thereof. Thereafter, air is funneled and passes through a central aperture 227 of the upper plenum wall 226.

The final central opening 227 for the central collection of air flow thereat is helpful in optimizing the efficiency of blower 220, which has a corresponding small, centrally-located inlet.

According to aspects of the present invention, the residence time of the air flowing through the filter element 236 is greatly improved by the labyrinthian path described above wherein the air flow enters either the inner or outer portions of a filter media pad and travels between the major surfaces of that pad (i.e., through the cross-sectional thickness thereof) to reach the outer or inner portions of the pad, respectively. Thus, the residence time and the area of the filter media contacted by the air flow is greatly improved over air flows directed generally transverse to the filter media entering and exiting opposed portions of the major surfaces thereof. The resulting difference in air filtering quality is significant and is achieved in a heretofore unrealized small or compact filter volume. Further, the cartridge-like filter element 236 is simply and economically formed, easily replaced and conveniently disposable.

In operation, a user opens the upper service door 14 of plenum 224 and inserts the prefilter 238 and the filter cartridge 236 therein, whereupon door 14 is closed, thereby completing the filter servicing. As will now be readily appreciated, the filter element 236 and the filter module 222 are particularly advantageous when used with cooking apparatus such as the french fryer arrangement described above. However, the filter elements and filter module could also be used with other apparatus, including that not related to cooking or food handling, and such is contemplated by the present invention. For example, the filter element and filter module could be employed with considerable advantage in units for filtering rooms and other living spaces.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. Semiautomatic frying apparatus comprising:
   a food-carrying basket having a forward mounting lip and a rearward handle;
   an elongated basket-supporting shaft having lip-engaging means for selectively engaging and disengaging said basket lip as said basket is moved in generally forward and rearward directions, respectively;
   means for mounting said shaft for rotation in opposite directions;
   rotation means for rotating said shaft in opposing directions between first and second positions in response to first and second rotational control signals;
   vessel means for holding a liquid cooking medium, said vessel means spaced from said shaft so that a basket having the lip thereof engaged with said lip engaging means is at least partly immersed in said liquid cooking medium when said shaft is in said first position an is removed from said liquid cooking medium when said shaft is in said second position;
   enclosure means beneath said vessel means;
   heating means for heating the liquid cooking medium in said vessel, including a generally plate-like member having an upper vessel-engaging surface dispose below said shaft and an internal electrical heat source, said plate-like member cooperating with said inclosure means to form a downwardly extending cavity therewith, said plate-like member defining a downwardly facing recess opening into said cavity and said heating means including at least one temperature sensor in said recess for sensing the temperature of said heating means and disposed adjacent said cavity so as to sense the temperature of the air thereat;

control means including means for initiating an input signal, and means responsive to said input signal for initiating a sequence of first and second control signals for rotating said shaft so as to bring said basket into and out of engagement with said liquid cooking medium; connecting means for transmitting said first and second control signals from said control means to said rotating means;

air ventilation means at least partly surrounding said vessel for inducing a flow of air for withdrawing cooking vapors rising from liquid cooking medium disposed in said vessel and for inducing a flow of air through said cavity and across said temperature sensor; and door means adjacent the front of said plate-like member, movable between an open position for allowing air flow through said cavity and across said at least one temperature sensor and a closed position for blocking air flow through said cavity and across said at least one temperature sensor.

2. Semiautomatic frying apparatus comprising:
a food-carrying basket;
an elongated basket-supporting shaft having engaging means for selectively engaging and disengaging said basket;
means for mounting said shaft for rotation in opposite directions;
rotation means for rotating said shaft in opposing directions between first and second positions in response to first and second rotational control signals;
vessel means for holding a liquid cooking medium, said vessel means spaced from said shaft so that a basket engaged with said shaft is at least partly immersed in said liquid cooking medium when said shaft is in said first position and is remove from said liquid cooking medium when said shaft is in said second position;
enclosure means beneath said vessel means;
heating means for heating the liquid cooking medium in said vessel, including a generally plate-like member having an upper vessel-engaging surface disposed below said shaft and an internal electrical heat source, said plate-like member cooperating with said enclosure means to form a downwardly extending cavity therewith, and said heating means including at least one temperature sensor with a first portion adjacent said plate-like member for sensing the temperature thereof an a second portion adjacent said cavity so as to sense the temperature of the air thereat;
control means including means for initiating an input signal, and means responsive to said input signal for initiating a sequence of first an second control signals for rotating said shaft so as to bring said basket into and out of engagement with said liquid cooking medium;
connecting means for transmitting said first and second control signals from said control means to said rotating means;
air ventilation means at least partly surrounding said vessel for inducing a flow of air for withdrawing cooking vapors rising from liquid cooking medium disposed in said vessel an for including a flow of air through said cavity and across said temperature sensor; and
door means adjacent the front of said plate-like member, movable between an open position for allowing air flow through said cavity and across said at least one temperature sensor and a closed position for blocking air flow through said cavity and across said at least one temperature sensor.

3. Semiautomatic frying apparatus comprising:
a food-carrying basket having a forwardly extending, overhanging mounting lip and a rearward handle;
an elongated basket-supporting shaft having a lip-engaging cradle means transversely mounted to the shaft so as to define in cooperation therewith a lip-receiving opening through which said basket lip is inserted and withdrawn as said basket is moved in a generally forward and rearward directions, said lip engaging cradle means including an upper support bar generally parallel to said shaft and spaced therefrom so as to define said lip-receiving opening in cooperation therewith, said cradle means further including a lower support bar extending generally parallel to said shaft and spaced from said shaft and said upper support bar, said upper and said lower support bars engaging the upper and the lower surfaces of a basket lip inserted in said lip-receiving opening, so as to support the basket for rotation about said shaft as said shaft is rotated in opposite directions;
means for mounting said shaft for rotation in opposite directions;
rotation means for rotating said shaft in opposing directions between first and second positions in response to first and second rotational control signals;
vessel means for holding a liquid cooking medium, said vessel means spaced from said shaft so that a basket having the lip thereof engaged with said lip engaging means is at least partly immersed in said liquid cooking medium when said shaft is in said first position and is remove from said liquid cooking medium when said shaft is in said second position;
heating means for heating the liquid cooking medium in said vessel;
control means including means for initiating an input signal, and means responsive to said input signal for initiating a sequence of first an second control signals for rotating said shaft so as to bring said basket into and out of engagement with said liquid cooking medium; and
connecting means for transmitting said first and second control signals from said control means to said rotating means.

4. Semiautomatic frying apparatus comprising:
a food-carrying basket having a forwardly extending, overhanging mounting lip and a rearward handle;
an elongated basket-supporting shaft having a lip-engaging cradle means transversely mounted to the shaft so as to define in cooperation therewith a lip-receiving opening through which said basket lip is inserted and withdrawn as said basket is moved in a generally forward and rearward directions, said lip engaging cradle means including an upper support bar generally parallel to said shaft and spaced therefrom so as to define said lip-receiving opening in cooperation therewith, said cradle means further including a lower support bar extending generally parallel to said shaft and spaced from said shaft and said upper support bar, said upper and said lower support bars engaging the upper and the lower surfaces of a basket lip inserted in said lip-receiving opening, so as to support the basket for rotation about said shaft as said shaft is rotated in opposite directions;

means for mounting said shaft for rotation in opposite directions;

rotation means for rotating said shaft in opposing directions between first and second positions in response to first and second rotational control signals;

vessel means for holing a liquid cooking medium, said vessel means spaced from said shaft so that a basket having the lip thereof engaged with said lip engaging means is at least partly immersed in said liquid cooking medium when said shaft is in said first position and is removed from said liquid cooking medium when said shaft is in said second position;

heating means for heating the liquid cooking medium in said vessel;

control means including means for initiating an input signal, and means responsive to said input signal for initiating a sequence of first and second control signals for rotating said shaft so as to bring said basket into and out of engagement with said liquid cooking medium;

connecting means for transmitting said first and second control signals from said control means to said rotating means; and guide pegs upwardly extending from said lower support bar to guide the basket lip toward the lip-receiving opening.

5. Semiautomatic frying apparatus comprising:

a food-carrying basket having a forward mounting lip and a rearward handle;

an elongated basket-supporting shaft having lip-engaging means for selectively engaging and disengaging said basket lip as said basket is moved in generally forward and rearward directions, respectively;

means for mounting said shaft for rotation in opposite directions;

rotation means for rotating said shaft in opposing directions between first and second positions in response to first and second rotational control signals;

vessel means for holding a liquid cooking medium, said vessel means spaced from said shaft so that a basket having the lip thereof engaged with said lip engaging means is at least partly immersed in said liquid cooking medium when said shaft is in said first position and is removed from said liquid cooking medium when said shaft is in said second position;

heating means for heating the liquid cooking medium in said vessel, including a generally plate-like member having an upper vessel-engaging surface disposed below said shaft, an opposed lower surface and an internal electrical heat source;

housing means surrounding said heating means so as to form a cavity therebelow;

said plate-like member defining a recess upwardly extending from the lower surface of the plate-like member so as to define an opening communicating with the cavity;

at least one temperature sensor substantially entirely dispose within said recess and having an upper end adjacent the heating means so as to sense the temperature thereof and a lower end adjacent the cavity;

control means including means for initiating an input signal, and means responsive to said input signal for initiating a sequence of first and second control signals for rotating said shaft so as to bring said basket into and out of engagement with said liquid cooking medium;

connecting means for transmitting said first and second control signals from said control means to said rotating means;

air ventilation means at least partly surrounding said vessel for inducing a flow of air for withdrawing cooking vapors rising from liquid cooking medium disposed in said vessel and for inducing a flow of air through said cavity and across the lower end of said temperature sensor;

said temperature sensor having a preselected temperature operating range which is effectively reduced as a result of its thermal communication with the air flow through said cavity; and door means adjacent the front of said plate-like member, movable between an open position for allowing air flow through said cavity and across said at least one temperature sensor and a closed position for blocking air flow through said cavity and across said at least one temperature sensor.

* * * * *

UNITED STATES PATENT AND TRADEMARK OFFICE
CERTIFICATE OF CORRECTION

PATENT NO. : 4,852,471

DATED : August 1, 1989

INVENTOR(S) : James P. Lansing

It is certified that error appears in the above-identified patent and that said Letters Patent is hereby corrected as shown below:

On the title page, after "Primary Examiner," change "Harvey O. Hornsby" to --Harvey C. Hornsby--.

On column 5, line 62, change the word "alone" to --along--.

On column 7, line 45, change the word "grasps" to --grasp--.

On column 8, line 18, delete the word "the" (first occurrence).

On column 9, line 17, change the word "substantial" to --substantially--.

On column 13, line 25, after the words "over-temperature" insert the phrase --condition, and opens switch contacts 218, an over- --.

On column 14, line 37, change the word "Further" to --further--.

On column 15, lines 54, 55, change "THERM-O-DISC" to --THERMO-O-DISC.--.

On column 18, line 56, Claim 1, change the word "an" to --and--.

On column 19, line 40, Claim 2, change the word "remove" to --removed--.

On column 19, line 53, Claim 2, change the word "an" to --and--.

On column 19, line 68, Claim 2, change the word "an" to --and--.

UNITED STATES PATENT AND TRADEMARK OFFICE
CERTIFICATE OF CORRECTION

PATENT NO. : 4,852,471

DATED : August 1, 1989

INVENTOR(S) : James P. Lansing

It is certified that error appears in the above-identified patent and that said Letters Patent is hereby corrected as shown below:

On column 19, line 68, Claim 2, change the word "including" to --inducing--.

On column 20, line 17, Claim 3, change the word "directions" to --direction--.

On column 20, line 41, Claim 3, change the word "remove" to --removed--.

On column 20, line 48, Claim 3, change the word "an" to --and--.

On column 20, line 63, Claim 4, change the word "directions" to --direction--.

On column 21, line 14, Claim 4, change the word "holing" to --holding--.

On column 22, line 21, Claim 5, change the word "dispose" to --disposed--.

Signed and Sealed this

Twenty-sixth Day of June, 1990

*Attest:*

HARRY F. MANBECK, JR.

*Attesting Officer*     *Commissioner of Patents and Trademarks*